(12) United States Patent
Graff et al.

(10) Patent No.: US 8,314,330 B2
(45) Date of Patent: Nov. 20, 2012

(54) UMBILICAL FOR SUBSEA INSTALLATION

(75) Inventors: Ragnvald Graff, Olso (NO); Einar Mjelstad, Fredrikstad (NO); Ketil Opstad, Gralum (NO); Bjorn H. Ramstad, Halden (NO); Morten Stensland, Krakeroy (NO); Jon Aarstein, Lovenstad (NO)

(73) Assignee: Nexans, Paris (FR)

( * ) Notice: Subject to any disclaimer, the term of this patent is extended or adjusted under 35 U.S.C. 154(b) by 2186 days.

(21) Appl. No.: 11/235,693

(22) Filed: Sep. 26, 2005

(65) Prior Publication Data
US 2012/0125652 A1    May 24, 2012

(30) Foreign Application Priority Data
Sep. 29, 2004   (NO) .................................... 20044129

(51) Int. Cl.
*F16L 11/127* (2006.01)
(52) U.S. Cl. ........................................... 174/47
(58) Field of Classification Search ...................... 174/47
See application file for complete search history.

(56) References Cited

U.S. PATENT DOCUMENTS

| 4,140,114 | A | * | 2/1979 | Moore et al. | ............. | 128/201.19 |
| 5,269,377 | A | * | 12/1993 | Martin | ........................... | 166/385 |
| 6,538,198 | B1 | | 3/2003 | Wooters | ........................ | 174/47 |

OTHER PUBLICATIONS

Norwegian Search Report—May 11, 2005.

* cited by examiner

*Primary Examiner* — Chau Nguyen
(74) *Attorney, Agent, or Firm* — Sofer & Haroun, LLP

(57) ABSTRACT

An umbilical for subsea installation has a core of at least two longitudinal elements like cables, tubes and solid and/or hollow filling elements and a cover surrounding the core. At least one of the hollow filling elements is provided with several perforations and the cover is permeable for sea water, thereby allowing seawater to fill the interior of the filler elements as well as the interstices between the cable, tube and the filler elements and the cover when the umbilical is submerged.

4 Claims, 1 Drawing Sheet

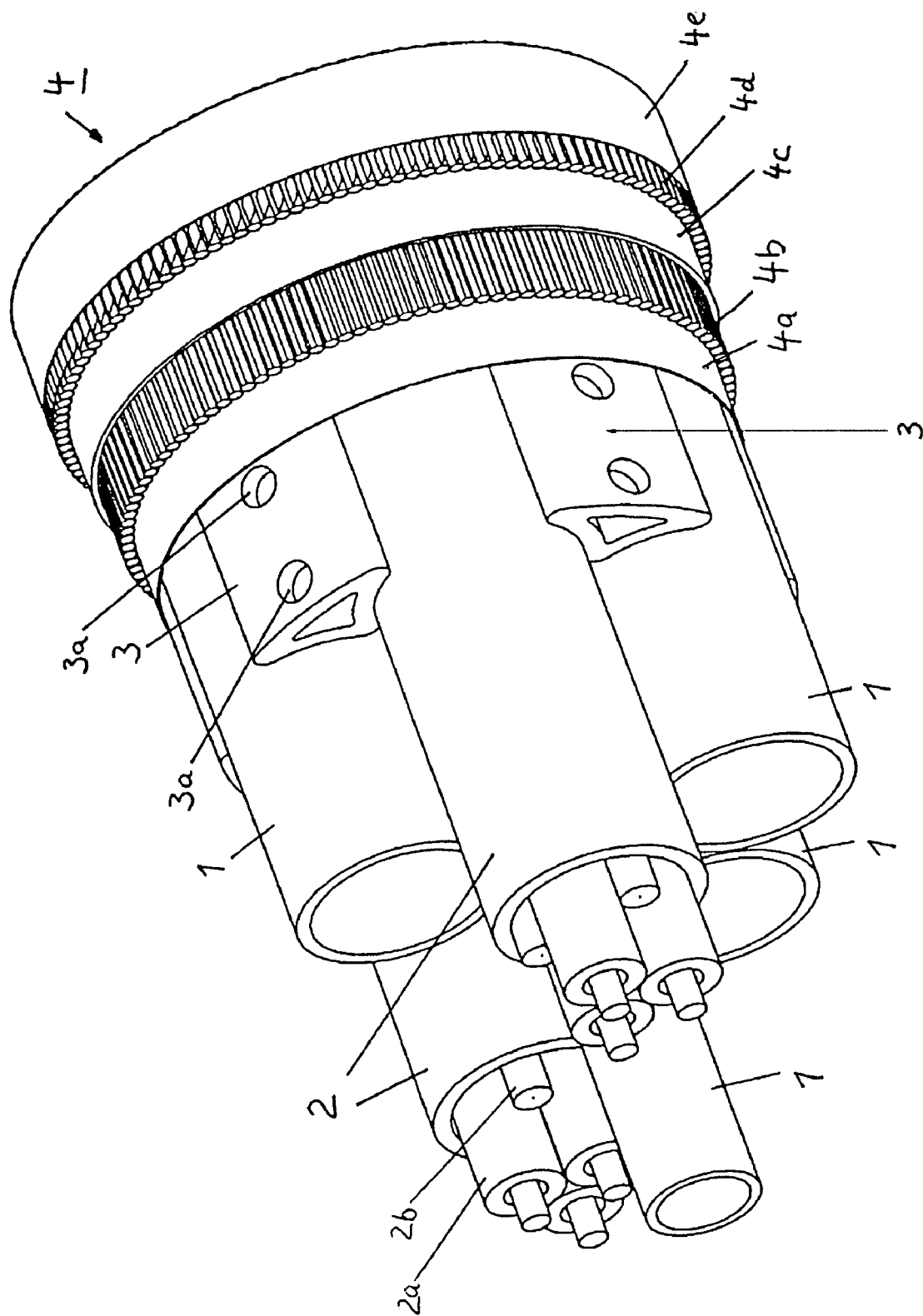

UMBILICAL FOR SUBSEA INSTALLATION

RELATED APPLICATION

This application is related to and claims the benefit of priority from Norwegian Patent Application No. 2004 4129, filed on Sep. 29, 2004, the entirety of which is incorporated herein by reference.

FIELD OF THE INVENTION

This invention relates to an umbilical for subsea installation.

BACKGROUND OF THE INVENTION

Norwegian patent 155 826 discloses an umbilical capable of transporting hydraulic fluids, chemicals, electric and optical signals and electrical power. The conduit for chemical transport is usually placed in the center, while those for electrical signals an power and the hydraulic pipes are placed peripherally around the central element or core element. The peripherally situated elements are wound into a helix around the central pipe. Each element is free to move longitudinally in relation to the other elements. The cable core is wrapped with a band, and the outer sheath is a thermoplastic layer extruded onto the cable core.

The core element may be a metal tube for conducting a liquid or may be an electrical cable for transmission of power or signals. As a metal tube it may be used, e. g. for injection of methanol into a drilling well.

The outer sheath may consist of polyethylene or polyurethane that is extruded onto the cable in a final step.

European patent specification 627 027 discloses a method and apparatus for manufacturing and laying out an umbilical. The umbilical consists of a central element a tube or several cables—with tubes or cables wound onto the central element. Filler elements are situated around and between the conduits or cables. The filler elements have voids designed to reduce weight and use of material. In addition, precise profile dimensions require uniform material thickness, necessitating the voids. The filler elements may consist of extruded polyvinylchloride profiles.

One drawback of the known umbilicals is that the voids act as buoyancy.

OBJECTS AND SUMMARY OF THE INVENTION

Thus there is a need for an umbilical which is particularly suited for laying out in subsea regions and according to the invention an umbilical, as mentioned by way of introduction is therefore suggested, said umbilical being characterized in that each of the hollow filler elements is provided with several perforation and the cover is permeable for sea water thereby allowing sea water to fill the interior of the filler elements as well as the interstices between the cable, tube and filler elements and the cover when the umbilical is submerged.

The air may escape when the umbilical is lowered into the water and water may escape when the umbilical is pulled from the water.

The filler elements will preferably be perforated during manufacturing of the filler elements, or before their installment in the umbilical in the production step of the umbilical.

The cross section of the filler elements is such that they fill completely the interstices between the cables and tubes of the umbilical.

The cover preferably consists of a braid of polymeric threads and armouring wires, so that sea water can permeate the cover.

BRIEF DESCRIPTION OF THE DRAWINGS

The drawing discloses a perspective view of one embodiment of an umbilical according to the present invention.

DETAILED DESCRIPTION

The core of the umbilical consists of several elements, which may be by example only steel tubes 1, tubes 2 made of a polymeric material e. g. polyethylene and filler elements 3. The tubes 2 may contain further elements e. g. electric cables 2a and fillers 2b.

The core of the umbilical is surrounded by a cover 4, which consists of helically wound tape 4a of polyamide, a layer 4b of polypropylene yarn, a helically wound steel tape 4c, a layer 4d of polypropylene yarn an outer sheath 4e of polyethylene. The sheath 4e is removed or ventilated in deep water.

Each of the filling elements 3 is hollow and has a lot of holes or perforations 3a, along the length of the filling elements 3a.

The cover 4 is permeable to water, so that, when the umbilical is submerged water will permeate the cover 4 and will fill the interstices between the tubes 1 and 2 and the interior of the filling elements 3. Air will escape from the interior of the umbilical and the buoyancy of the umbilical is reduced.

When the umbilical is raised water will escape and the weight of the umbilical is reduced.

The umbilical according to the invention may have filling elements of various kind. Some of the filling elements may be solid, some may be hollow and some may be hollow with perforations.

The invention claimed is:

1. Umbilical for subsea installation comprising:
   a core of at least two longitudinal elements selected from the group consisting of cables, tubes, solid filling elements and hollow filling elements, with at least one of said two longitudinal elements being a hollow filling element; and
   a cover surrounding the core,
   wherein said at least one hollow filling element is provided with several perforations and,
   wherein the cover is permeable for sea water thereby allowing seawater to fill the interior of said at least one hollow filling element as well as the interstices between the at least two longitudinal elements and the cover when the umbilical is submerged.

2. The umbilical according to claim 1, wherein the perforations of said at least one hollow filling element are produced before installing the filler elements in the umbilical.

3. The umbilical according to claim 1, wherein said at least one hollow filling element has a nearly triangular cross section.

4. The umbilical according to claim 1, wherein the cover is a braid of polymeric threads and armouring wires.

* * * * *